(12) United States Patent
Watanabe et al.

(10) Patent No.: US 7,439,903 B2
(45) Date of Patent: Oct. 21, 2008

(54) METHOD OF PREVENTING INTERFERENCE BETWEEN RADARS AND RADAR SYSTEM HAVING INTERFERENCE PREVENTING FUNCTION

(75) Inventors: Yuu Watanabe, Toyota (JP); Kazuma Natsume, Obu (JP)

(73) Assignee: Denso Corporation, Kariya (JP)

( * ) Notice: Subject to any disclaimer, the term of this patent is extended or adjusted under 35 U.S.C. 154(b) by 233 days.

(21) Appl. No.: 11/417,336

(22) Filed: May 3, 2006

(65) Prior Publication Data

US 2006/0262009 A1 Nov. 23, 2006

(30) Foreign Application Priority Data

May 20, 2005 (JP) .............................. 2005-148485

(51) Int. Cl.
*G01S 13/00* (2006.01)

(52) U.S. Cl. ........................................ 342/59; 342/159

(58) Field of Classification Search ............ 342/13–20, 342/59, 70–72, 82–89, 99, 109–112, 115, 342/117, 128–137, 159, 192, 195, 200–204, 342/74, 75

See application file for complete search history.

(56) References Cited

U.S. PATENT DOCUMENTS

| | | | | |
|---|---|---|---|---|
| 3,911,432 A | * | 10/1975 | Williams | 342/59 |
| 4,010,468 A | * | 3/1977 | Fishbein et al. | 342/59 |
| 4,613,862 A | * | 9/1986 | O'Donnell | 342/59 |
| 5,317,320 A | * | 5/1994 | Grover et al. | 342/159 |
| 5,920,279 A | * | 7/1999 | Andersson | 342/59 |
| 6,005,511 A | * | 12/1999 | Young et al. | 342/70 |
| 6,888,491 B2 | * | 5/2005 | Richter | 342/70 |

FOREIGN PATENT DOCUMENTS

JP 2004-170183 6/2004

OTHER PUBLICATIONS

El-Aziz (Circuits and Systems, 1992. Proceedings of the 35th Midwest Symposium on, Aug. 9-12, 1992 pp. 166-169 vol. 1).*

\* cited by examiner

*Primary Examiner*—Thomas H. Tarcza
*Assistant Examiner*—Peter M Bythrow
(74) *Attorney, Agent, or Firm*—Harness, Dickey & Pierce, PLC

(57) ABSTRACT

A radar system mounted on a vehicle includes a first radar and a second radar, each having a transmitter-receiver and a signal processor. The transmitter-receiver transmits radar waves to detect objects such as another vehicle or other obstacles. An operating cycle period T1, T2 and a transmission time X1, X2 during which the radar waves are transmitted are set in both radars to satisfy the formula: $K \cdot T2 + X2 + X1 \leq T1 \leq (K+1) \cdot T2 - X2 - X1$ under a condition that T1>T2, where K is a positive integer. By setting both radars in this manner, interference between two radars is avoided without using additional devices in the radar system, and a high detection accuracy is realized.

4 Claims, 6 Drawing Sheets

METHOD OF PREVENTING INTERFERENCE BETWEEN RADARS AND RADAR SYSTEM HAVING INTERFERENCE PREVENTING FUNCTION

CROSS-REFERENCE TO RELATED APPLICATION

This application is based upon and claims benefit of priority of Japanese Patent Application No. 2005-148485 filed on May 20, 2005, the content of which is incorporated herein by reference.

BACKGROUND OF THE INVENTION

1. Field of the Invention

The present invention relates to a method for preventing interference between radars and to a radar system having a function of preventing interference between radars.

2. Description of Related Art

A radar system for detecting a target (such as a preceding vehicle or an obstacle) by transmitting radar waves and receiving waves reflected by the target has been known hitherto. If plural radars are mounted on a vehicle, interference between radars has to be prevented to secure detecting accuracy of the radars.

When a pair of radars are mounted on a preceding vehicle M1 and a following vehicle M2, as shown in FIG. 5A, there is a possibility that interference occurs between a rear radar Rr of the preceding vehicle M1 and a front radar Rf of the following vehicle M2. Further, when a pair of radars Ra and Rb each detecting obstacles located in neighboring areas, as shown in FIG. 5B, radar waves transmitted by the radar Rb may be received by the radar Ra, causing interference between radars Ra and Rb.

To prevent interference between two radars, JP-A-2004-170183 proposes a radar system having a device for detecting the interference. When an interference with another radar is detected in the radar system, either one of a center frequency, a modulation method, a scanning width, a scanning direction, a scanning cycle period and scanning timing is changed in the radar system. In the proposed system, however, it is required to include additional devices for detecting and preventing the interference. This makes the system complex and expensive. In the case where two radars are mounted on the same vehicle, as shown in FIG. 5B, it is possible to prevent the interference by synchronizing operation timing between two radars.

However, it is difficult to apply such a counter measure to the inference between two radars mounted on different vehicles, as shown in FIG. 5A. If the rear radar Rr of the preceding vehicle M1 and the front radar Rf of the following vehicle M2 happen to be operated at a same time when both radars have a same cycle period, interference between both radars occurs continuously, as shown in FIG. 6A (in FIGS. 6A and 6B, either Rr or Rf is labeled R1 and the other is labeled R2). Even when the cycle periods of both radars are different from each other, as shown in FIG. 6B, the interference may occur continuously more than two times. When the interference occurs continuously more than two times, detecting accuracy of the radar system is greatly damaged.

SUMMARY OF THE INVENTION

The present invention has been made in view of the above-mentioned problem, and an object of the present invention is to provide a method of preventing interference between radars and to provide a radar system having a function of preventing the interference.

The present invention is advantageously applicable to a radar system mounted on an automotive vehicle for detecting objects such as a preceding vehicle or other obstacles. The radar system includes a first radar and a second radar. Each radar is composed of a transmitter-receiver for transmitting radar waves and for receiving radar waves reflected by the obstacles, and a signal processor for processing signals fed from the transmitter-receiver and for generating target information. To prevent interference between the first radar and the second radar, a cycle period T1, T2 in both radars and a transmission time X1, X2 (a period of time during which radar waves are transmitted) in both radars are set to satisfy the following formula: $K \cdot T2 + X2 + X1 \leq T1 \leq (K+1) \cdot T2 - X2 - X1$ under a condition that $T1 > T2$, where K is a positive integer.

In the case where a radar system is composed of the first radar for detecting objects located in front of a vehicle and the second radar for detecting objects located behind the vehicle, and a vehicle having this radar system follows another vehicle having the same radar system, an interference between the second radar of the preceding vehicle and the first radar of the following vehicle is avoided by setting the radars to satisfy the above formula. In the case where a first radar is used for detecting front objects and the second radar is used for detecting objects located in the slanting front direction, both radars being mounted on a same vehicle, an interference between two radars is avoided by setting the radars to satisfy the above formula. Though the interference between radars may occur just once even when the radars are set to satisfy the above formula, the interference does not continuously occur more than two times.

According to the present invention, the interference between two radars is prevented without using additional devices in the radar system, and high detection accuracy is secured in the radar system. Other objects and features of the present invention will become more readily apparent from a better understanding of the preferred embodiments described below with reference to the following drawings.

DETAILED DESCRIPTION OF THE PREFERRED EMBODIMENTS

Figure 1A:
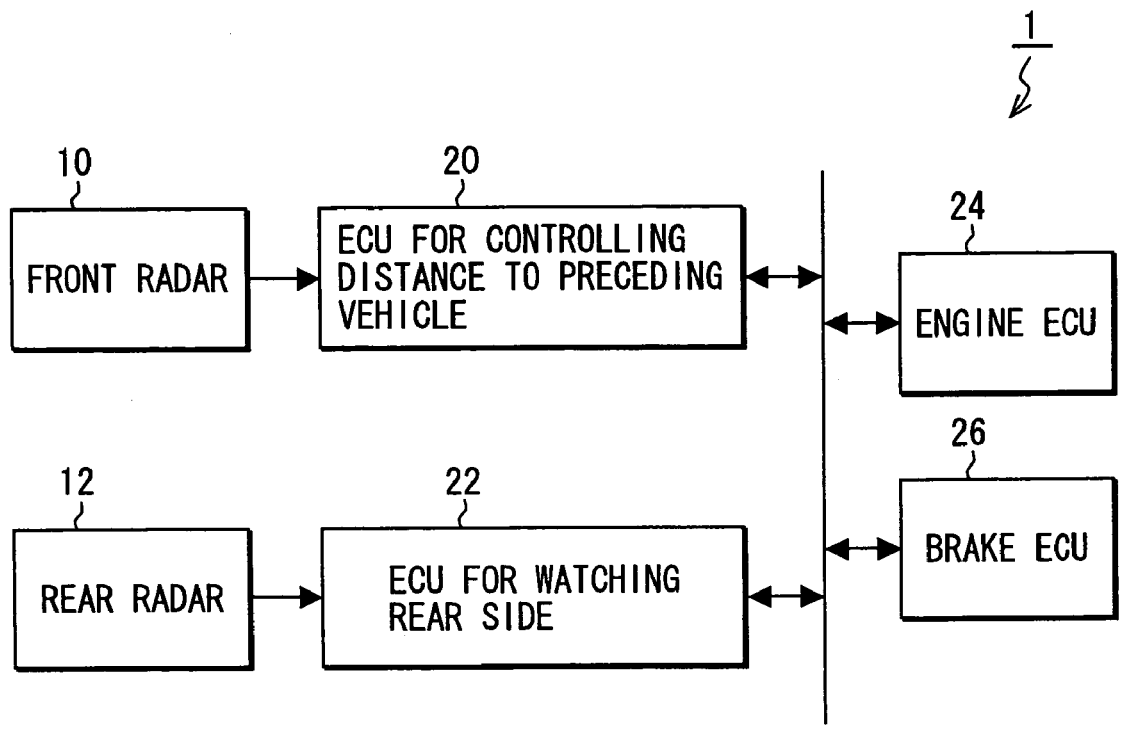
FIG. 1A is a block diagram showing a radar system mounted on an automotive vehicle, as a first embodiment of the present invention.
Figure 1B:
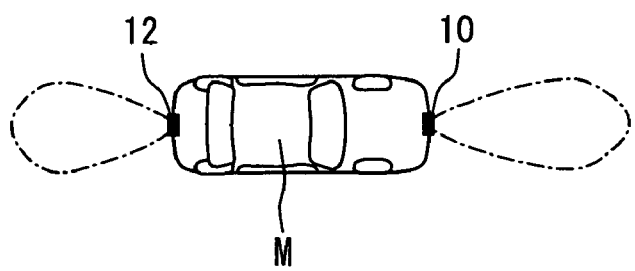
FIG. 1B is a schematic view showing an automotive vehicle on which a front radar and a rear radar are mounted.
Figure 2:
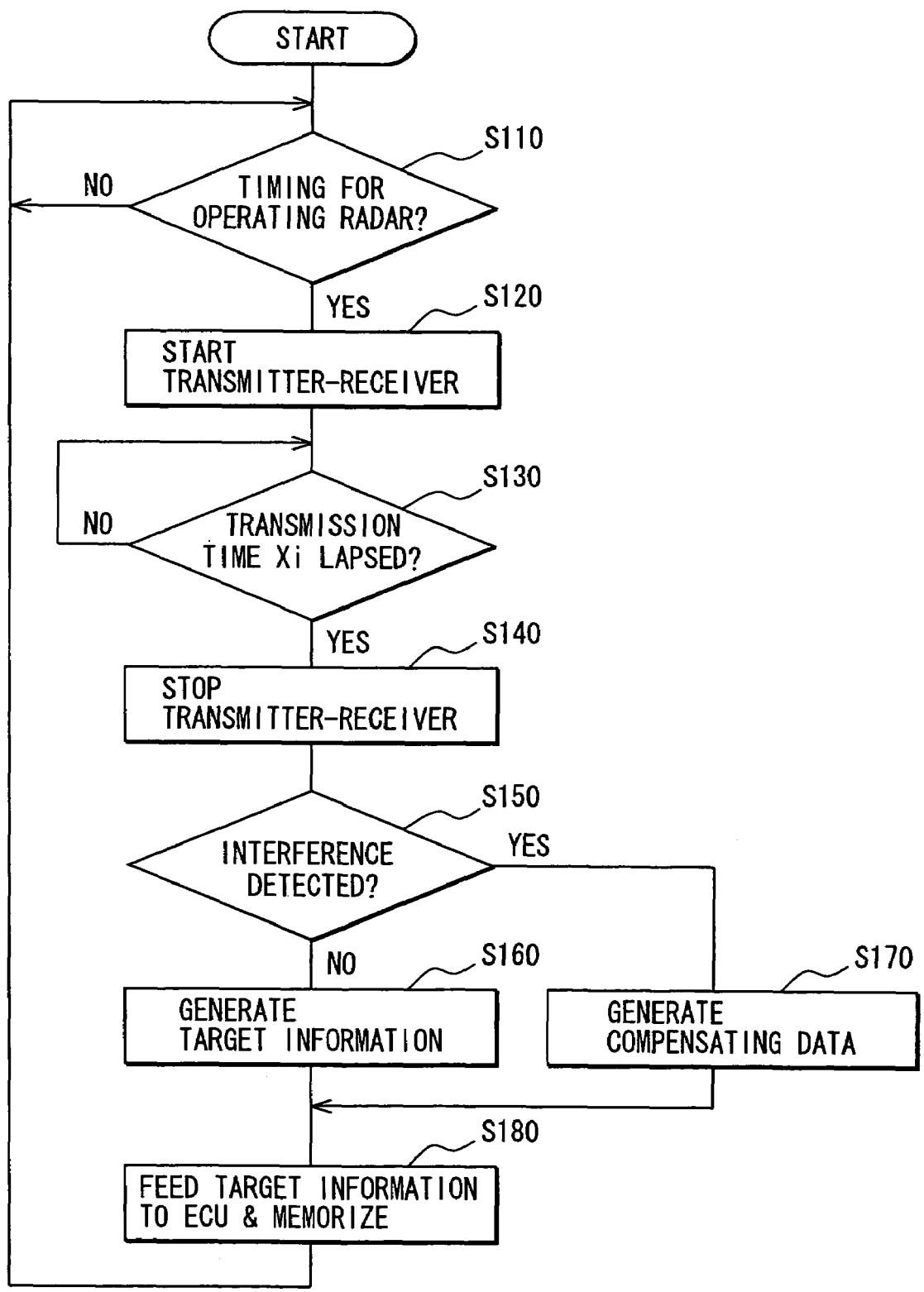
FIG. 2 is a flowchart showing a process of detecting a target by the radar system.

A first embodiment of the present invention will be described with reference to FIGS. 1A, 1B and 2. A block diagram of a radar system 1 mounted on an automotive vehicle is shown in FIG. 1A. A front radar 10 for detecting a front target such as a preceding vehicle or an object and a rear radar 12 for detecting a rear target such as a following vehicle or an object located behind a vehicle M are mounted on the vehicle M, as shown in FIG. 1B.

The radar system 1 includes the front radar 10, the rear radar 12, an electronic control unit (ECU) 20 for controlling a distance between the vehicle M and a preceding vehicle, an ECU 22 for watching rear side of the vehicle M, an engine ECU 24, a brake ECU 26. These components of the radar system 1 are interconnected through a local area network (LAN) communication bus. Each ECU (20, 22, 24, 26) is a known microcomputer including a bus controller for performing communication through the LAN communication bus. Data communication among ECUs through the LAN communication bus is performed under the CAN protocol which was proposed by Robert Bosch in Germany and widely used in an on-board network.

The brake ECU 26 sends signals representing brake pedal conditions to the ECU 20 through the LAN communication bus, and controls a brake actuator for increasing or decreasing a brake pressure according to the brake pedal conditions. The brake pedal conditions are detected based on signals from a M/C pressure sensor in addition to signals from a steering sensor and a yaw rate sensor. The engine ECU 24 sends signals fed from a vehicle speed sensor, a throttle sensor, an acceleration pedal sensor to the ECU 20, and receives information such as a target acceleration, a request for cutting fuel and diagnosis from the ECU 20. The engine ECU 24 controls a throttle actuator of an internal combustion engine according to driving conditions specified by information received from the ECU 20.

The front radar 10, a warning buzzer, a cruise control switch, a switch for setting a target distance to a preceding vehicle and other components (not shown) are connected to the ECU 20 for controlling a distance to a preceding vehicle. The ECU 20 receives information such as a present driving speed and engine conditions from the engine ECU 24, and receives information such as a steering angle, a yaw rate, brake conditions from the brake ECU 26. The ECU 20 determines a preceding vehicle, a distance to which has to be controlled, according to target information (explained later) received from the front radar 10. The ECU 20 sends signals for controlling a distance between the preceding vehicle and the own vehicle based on signals fed from a cruise control switch and a switch for setting a distance, such as a target acceleration, a request for cutting fuel and diagnosis information, to the engine ECU 24. The ECU 20 also sends signals such as the target acceleration and braking requests to the brake ECU 26. In addition, the ECU 20 determines whether a warning is necessary, and operates a warning buzzer when the warning is necessary.

The rear radar 12, a warning buzzer (not shown) and other components are connected to the ECU 22 for watching the rear side. The ECU 22 operates the warning buzzer, an airbag and a seatbelt tightener when necessary according to a target information fed from the rear radar 12.

The front radar 10 is a so-called FMCW radar composed of a transmitte-receiver and a signal processor. The transmitter-receiver transmits frequency-modulated millimeter radar waves and generates beat signals by mixing a local signal composed of part of the transmitting signals with waves reflected by a front target. The signal processor generates target information including a distance from the own vehicle to the target and a relative speed by sampling the beat signals. The target information generated in the signal processor is fed to the ECU 20. Similarly, the rear radar 12 includes the transmitter-receiver and the signal processor. Target information generated in the signal processor of the rear radar is fed to the ECU 22 for watching the rear side.

A process performed in the signal processor of the front radar 10 and the rear radar 12 will be described with reference to FIG. 2. The same process is performed in both signal processors in the front radar 10 and the rear radar 12. In the following description, the radar is generally referred to as Ri (R1 for the front radar 10 and R2 for the rear radar 12). A cycle period of the radar Ri is referred to as Ti (T1 for R1 and T2 for R2), and a transmission time (a period of time during which radar waves are transmitted) of the radar Ri is referred to as Xi (X1 for R1 and X2 for R2).

At step S110, whether it is now a timing for operating the radar Ri (which is to be operated with the period Ti) is checked. If it is the timing, the process proceeds to step S120, where operation of the transmitter-receiver is started. If not, the process stays there until the timing comes. At step S130, whether the transmission time Xi has lapsed after the transmitter-receiver is operated is checked. If the transmission time Xi has lapsed, the process proceeds to step S140, where the operation of the transmitter-receive is stopped. If the transmission time Xi has not lapsed, the process stays there until the transmission time Xi lapses.

At step S150, whether an interference is detected or not is determined based on the sampling data of the signal processor. If the interference is not detected, the process proceeds to step S160, where a target is detected and target information is generated based on the sampling data. If the interference is detected, the process proceeds to step S170, where the sampling data obtained at this time is canceled and a data replacing the canceled data is estimated based on a history of previous sampling data. The estimated data is used as the present data. In the case where the period Ti is sufficiently short, the previous sampling data may be used as the present sampling data. Then, at step S180, the target information is fed to the ECU 20 if the radar Ri is R1, or to the ECU 22 if the radar Ri is R2. At the same time, the target information is continuously memorized.

Figure 4A:
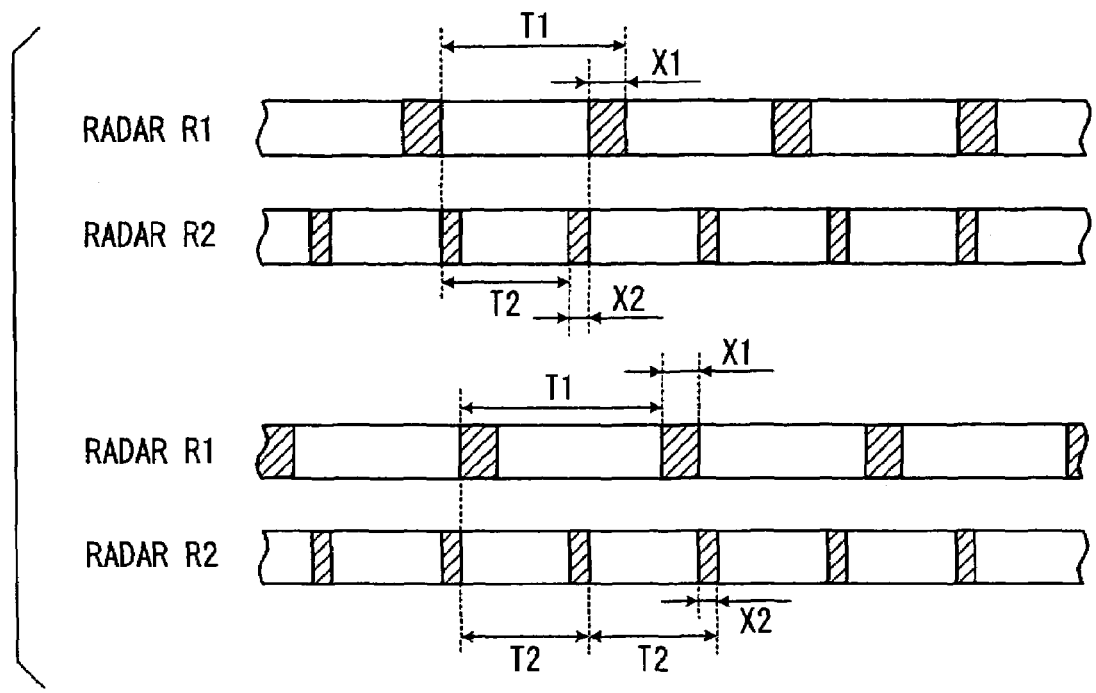
FIG. 4A is a timing chart for explaining a formula for preventing interference between two radars R1 and R2, wherein a factor K in the formula is 1.
Figure 4B:
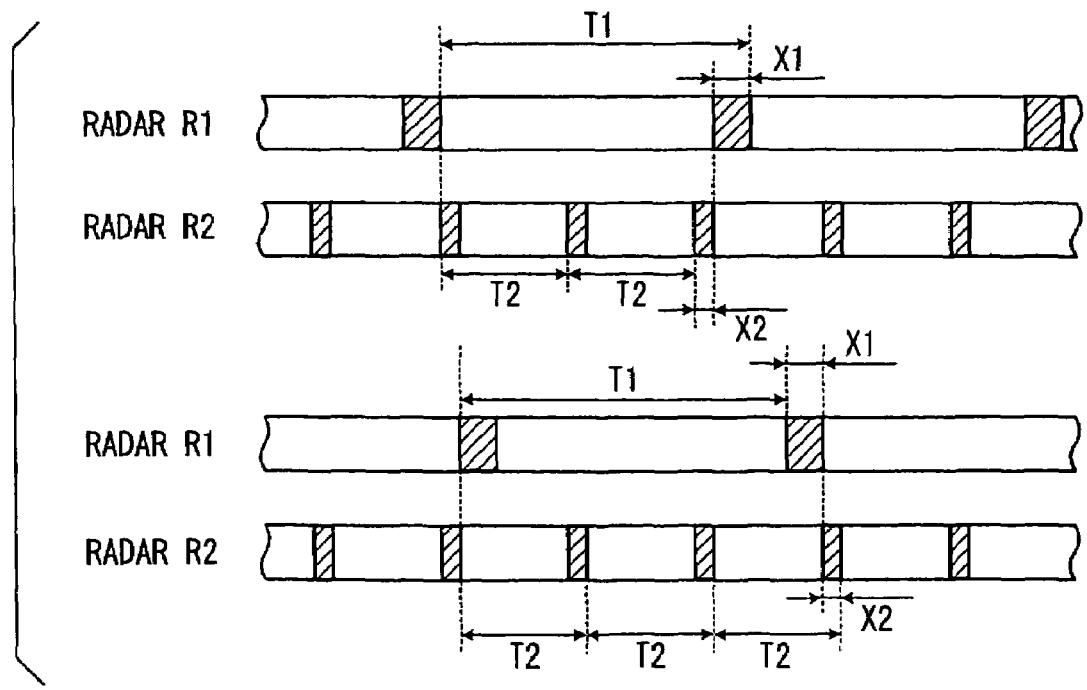
FIG. 4B is a timing chart for explaining a formula for preventing interference between two radars R1 and R2, wherein a factor K in the formula is 2.
Figure 5A:
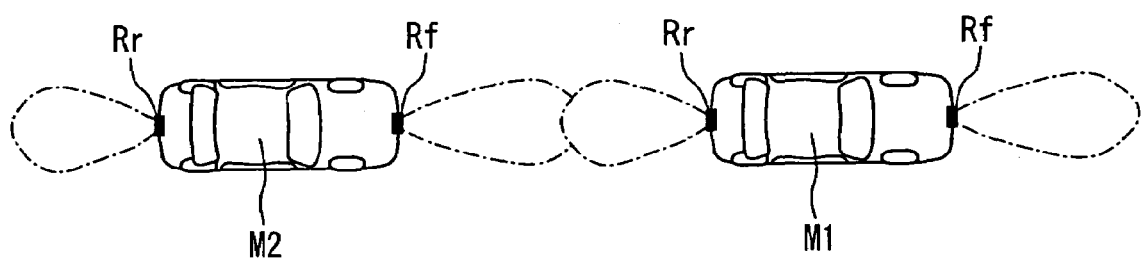
FIG. 5A is a schematic view showing a situation where an interference between two radars mounted on different vehicles occurs.
Figure 5B:
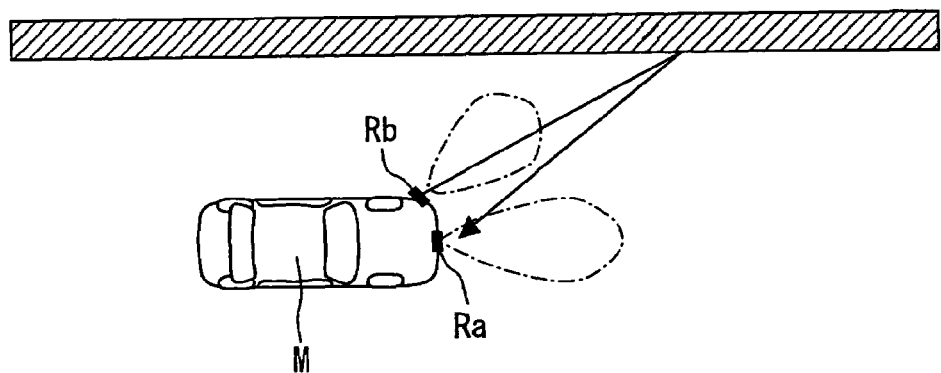
FIG. 5B is a schematic view showing a situation where an interference between two radars mounted on the same vehicle occurs.
Figure 6A:
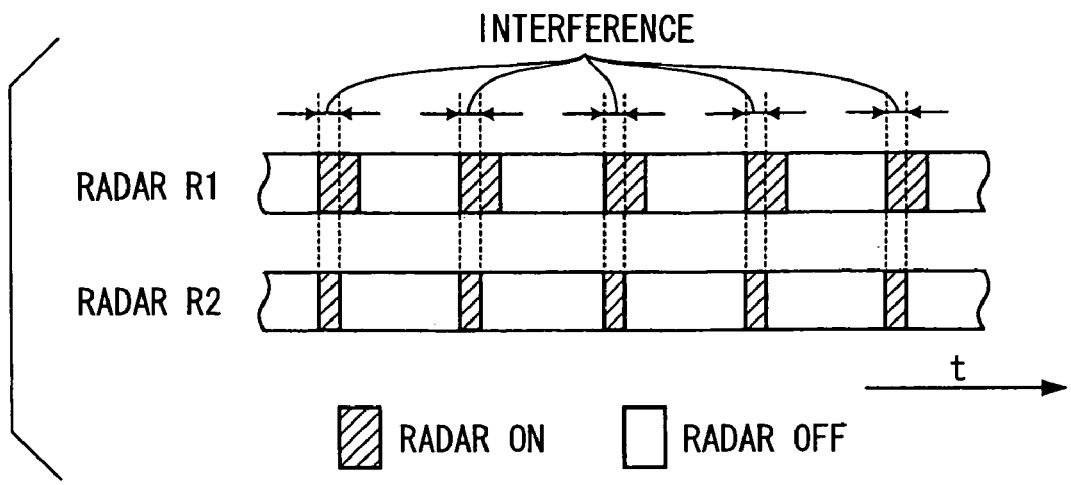
FIG. 6A is a timing chart showing operation of conventional radars, in which interference between two radars continuously occurs.
Figure 6B:
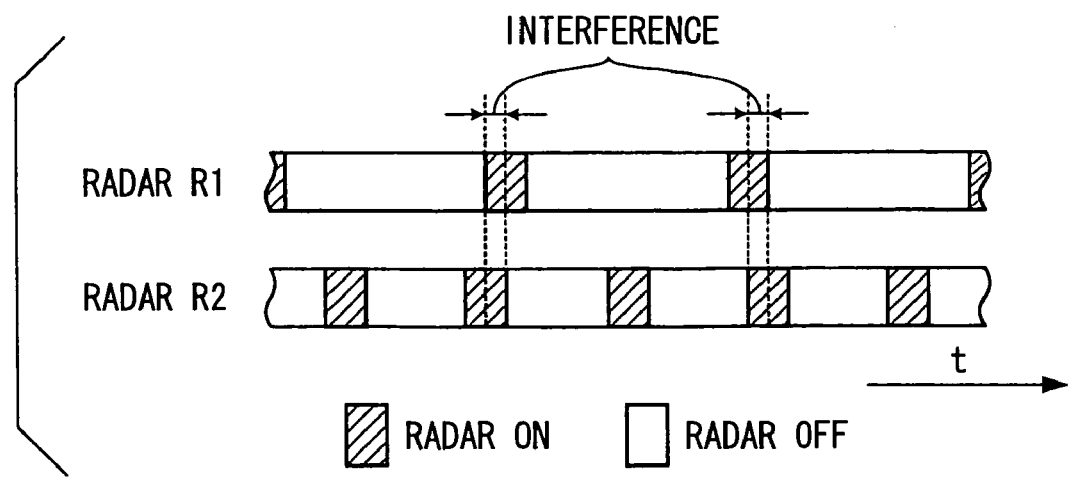
FIG. 6B is a timing chart showing operation of conventional radars, in which interference between two radars occurs two times in a short period of time.

The cycle period T1, T2 and transmission time X1, X2 in both radars R1, R2 are set to satisfy the following formulae:

$$K \cdot T2 + X2 + X1 \leq T1 \leq (K+1) \cdot T2 - X2 - X1 \qquad (a)$$

where T1>T2>X1+X2 and K is a positive integer. FIGS. 4A and 4B are timing charts showing operation of the radars R1 and R2, in which the period T1, T2 and the transmission time X1, X2 are set to satisfy the above formulae. FIG. 4A shows a timing chart in which the integer K is set to 1, and FIG. 4B shows a timing chart in which the integer K is set to 2. Charts at an upper half in FIGS. 4A and 4B show the operation timing in which the period T1 is the shortest, and charts at a lower half in FIGS. 4A and 4B show the operation timing in which the period T1 is the longest. The following formulae are derived from the timing charts shown in FIGS. 4A and 4B.

$$T2+X2 \leq T1-X1 \quad (1)$$

$$T1+X1 \leq 2 \cdot T2-X2 \quad (2)$$

$$2 \cdot T2+X2 \leq T1-X1 \quad (3)$$

$$T1+X1 \leq 3 \cdot T2-X2 \quad (4)$$

The formula (1) is derived from the charts in the upper half of FIG. 4A, the formula (2) from the charts in the lower half of FIG. 4A, the formula (3) from the charts in the upper half of FIG. 4B, and the formula (4) from the charts in the lower half of FIG. 4B. The formula (a), where K is set to 1, is obtained by combining the formulae (1) and (2), while the formula (a), where K is set to 2, is obtained by combining the formulae (3) and (4). The formula (a) is a generalized form of the formulae (1)-(4).

When the same radar systems, in which the period T1, T2 and the transmission time X1, X2 are set to satisfy the formula (a), are used in two vehicles, the interference between two radars does not occur continuously more than two times if a single interference happens to occur. The single interference can be easily overcome by replacing the data at the interference with the previous data, as done at step S170 shown in FIG. 2. Therefore, a highly reliable target information can be obtained without using additional devices for preventing the interference.

Figure 3A:
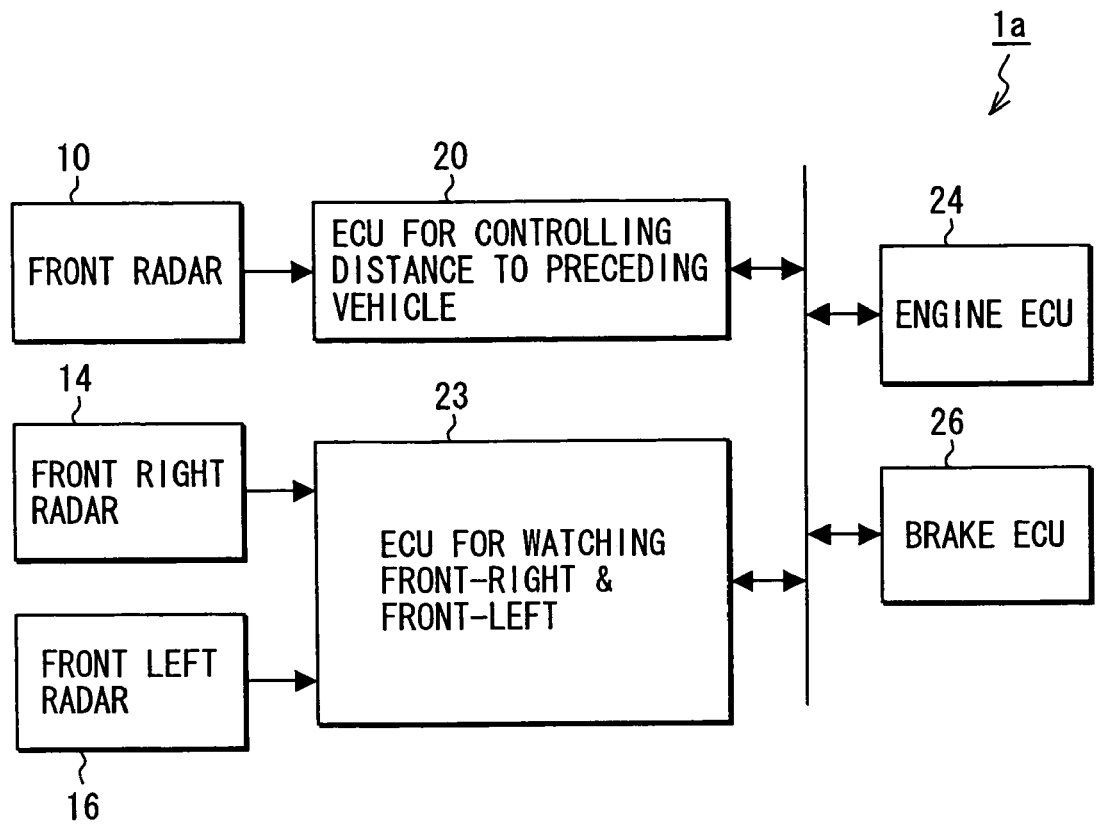
FIG. 3A is a block diagram showing a radar system mounted on an automotive vehicle, as a second embodiment of the present invention.

A second embodiment of the present invention will be described with reference to FIGS. 3A and 3B. An on-board radar system 1a of this embodiment includes a front-right radar 14 and a front-left radar 16 in addition to the front radar 10. The rear radar 12 used in the first embodiment is eliminated. An ECU 23 for watching the front-right and the front-left of the vehicle M is used in place of the ECU 22 used in the first embodiment. Other structures of the second embodiment are the same as or similar to those of the first embodiment.

Figure 3B:
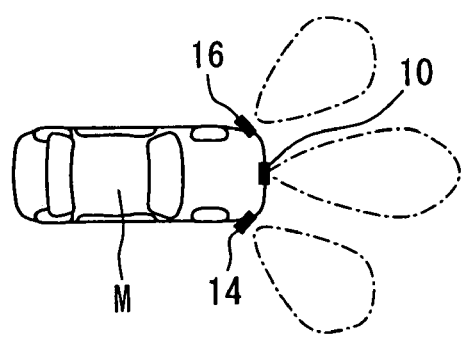
FIG. 3B is a schematic view showing an automotive vehicle on which a front radar, a front-left radar and a front right radar are mounted.

The front-right radar 14 is mounted on a front portion of the vehicle M to detect a target located relatively close to the vehicle in the slanting front-right direction, as shown in FIG. 3B. Similarly, the front left radar 16 is mounted on a front portion of the vehicle to detect a target located relatively close to the vehicle in the slanting front-left direction. The front-right radar 14 and the front-left radar 16 are connected to the ECU 23 to feed the target information. A warning buzzer is connected to the ECU 23 for giving a warning to a driver when judged necessary based on the target information fed from the front-right radar 14 and the front-left radar 16. Further, the ECU 23 sends signals for requesting braking operation to the brake ECU 26 when necessary.

The front-right radar 14 and the front-left radar 16 are similarly structured as the front radar 10. That is, each of the front-right radar 14 and the front-left radar 16 includes the transmitter-receiver and the signal processor and sends the target information generated in the signal processor to the ECU 23. Both of the front-right radar 14 and the front-left radar 16 synchronously operates with the same cycle period and the same transmission time. Assuming that the front radar 10 is the radar R1 and the radars 14, 16 is the radar R2 collectively, the cycle period T1, T2 and the transmission time X1, X2 of the radars R1, R2 are set to satisfy the same formula (a) as that used in the first embodiment.

In the on-board radar system 1a thus structured, the interference between the front radar 10 and either one of the front-right radar 14 and the front-left radar 16 does not occur continuously more than two times. Therefore, in the same manner as in the first embodiment, a highly reliable target information is obtained in the radar system 1a without using additional devices for preventing the interference.

The present invention is not limited to the embodiments described above, but it may be variously modified. For example, though the FMCW radars are used as the radars R1 and R2 in the foregoing embodiments, it is, of course, possible to use other types of radars. Different types of radars may be used as the radar R1 and the radar R2, respectively. Though the front radar 10 is labeled as R1 and the rear radar 12 (or the front-right radar 14 or the front-left radar 16) is labeled as R2 in the foregoing embodiment, they may be reversed.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A method of preventing interference when operating a radar system comprising:
   providing a first radar;
   providing a second radar;
   activating said first radar for a first transmission time (X1) at each of a plurality of first cycle periods (T1);
   activating said second radar for a second transmission time (X2) at each of a plurality of second cycle periods (T2); and
   controlling the activation of said first and second radars such that the formula K·T2+X2+X1≦T1≦(K+1)·T2−X2−X1 where K is a positive integer.

2. A radar system mounted on an automotive vehicle for detecting objects, the radar system comprising:
   means for actuating a first radar for a first transmission time (X1) at each of a plurality of first cycle periods (T1);
   means for actuating a second radar for a second transmission time (X2) at each of a plurality of second cycle periods (T2); and
   means for controlling the activation of said first and second radars such that the formula K·T2+X2+X1≦T1≦(K+1)·T2−X2−X1 where K is a positive integer.

3. The radar system as in claim 2, wherein:
   the first radar is a radar for detecting objects located in front of the automotive vehicle, and the second radar is a radar for detecting objects located behind the automotive vehicle.

4. The radar system as in claim 2, wherein:
   a detecting area of the first radar and a detecting area of the second radar are adjacent each other.

* * * * *